United States Patent Office 3,029,277
Patented Apr. 10, 1962

3,029,277
AROMATIC ETHERS
Jean Metivier, Arpajon, France, assignor to Societe des Usines Chimiques Rhone-Poulenc, Paris, France, a corporation of France
No Drawing. Filed May 22, 1958, Ser. No. 736,962
Claims priority, application France May 28, 1957
6 Claims. (Cl. 260—521)

This invention is for improvements in or relating to aromatic ethers and is more particularly concerned with aryloxyalkoxyaliphatic compounds, to processes for their preparation and to compositions containing one or more of such compounds and useful for the modification of plant growth.

The use in agriculture and horticulture of various types of chemicals for the purpose of modifying plant growth is now a customary practice, and a considerable number of such substances are employed on a very large scale for producing various different effects upon plant growth. These effects include modification of growth for the purpose of enhancing the useful yield of crops later to be gathered from the plants so modified, and the destruction of unwanted plants, i.e. weeds in areas containing useful crops.

Of recent years, the so-called "auxins" have become particularly important as selective herbicides, their lethal effect being a physiological and systemic one rather than that of a plant poison which simply alters and destroys. The advent of such highly successful auxins as 2:4-dichlorophenoxyacetic and 4-chloro-2-methylphenoxyacetic acid derivatives has greatly stimulated research and development throughout the world but there is still much that is not known concerning the precise relationship between chemical structure of the auxin and effect upon plant growth as to variation of effect according to concentration and structure of the chemical employed (in some cases the chemical acts at low concentration to modify plant growth in a useful way and at a higher concentration to kill the plant) such that prediction as to effect on plant growth of change in chemical structure of the auxin cannot yet be made with anything like reasonable certainty. This is particularly so in the field of the aryloxyaliphatic compounds as is emphasised by Shaw and Gentner ("Weeds," Journal of the Weed Society of America V, (2): 75 to 90, 1957).

It is the object of this invention to provide new aryloxyalkoxyaliphatic compounds and compositions containing them which possess useful plant growth regulating properties which could not have been predicted from knowledge of their chemical structure.

The compounds of the present invention are the aryloxyalkoxyaliphatic acids and derivatives thereof which conform to the general formula:

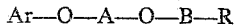  Ar—O—A—O—B—R    I in which Ar represents an aryl group, such as phenyl or naphthyl, which may be substituted by one or more halogen atoms, formyl or hydroxymethyl groups or alkyl groups containing at most four carbon atoms, A and B each represent a straight- or branched-chain divalent aliphatic hydrocarbon group containing at most four carbon atoms, R represents a carboxyl, alkoxycarbonyl, carbamoyl or cyano group including, where R is a carboxyl group, salts thereof.

Preferred compounds are those in which Ar is a phenyl group, the aliphatic hydrocarbon group A contains two or three carbon atoms, and the group B is methylene and, more especially, those in which Ar is a phenyl group substituted in the para-position by a chlorine atom. Of outstanding importance are 2-(4-chlorophenoxy)ethoxyacetic acid, 2-(2:4-dichlorophenoxy)ethoxyacetic acid, 2-(2-methyl-4-chlorophenoxy)ethoxyacetic acid, 3-(4-chlorophenoxy)propoxyacetic acid, 2-(4-chlorophenoxy)-propoxyacetic acid, 2-(2-formyl-4-chlorophenoxy)ethoxyacetic acid, 2-(2-hydroxymethyl-4-chlorophenoxy)ethoxyacetic acid, and 2-(3:4-dichlorophenoxy)ethoxyacetic acid, together with their salts, esters, amides and nitriles.

According to features of the invention, the new compounds conforming to general Formula I are obtained by the following methods:

(1) Interaction of a reactive ester of the formula:

  Ar—O—A—X    II (wherein X represents an acid residue, such as a halogen atom or a sulphonic group, and Ar and A are as hereinbefore defined) with a metallic derivative, such as an alkali metal derivative, of an alcohol of the formula:

  HO—B—R    III (wherein B and R are as hereinbefore defined).

(2) Interaction of a metallic derivative, such as an alkali metal derivative, of an alcohol of the formula:

  Ar—O—A—OH    IV (wherein Ar and A are as hereinbefore defined) with a reactive ester of the formula:

  X—B—R    V (wherein X, B and R are as hereinbefore defined).

(3) Interaction of a metallic derivative, such as an alkali metal derivative, of an alcohol of the formula:

  Ar—OH    VI (wherein Ar is as hereinbefore defined) with a reactive ester of the formula:

  X—A—O—B—R    VII (wherein X, A, B and R are as hereinbefore defined).

Each of the foregoing processes may be followed by conversion of the group R into another group R or, in the case of starting materials in which the group Ar is substituted by a formyl group, conversion of the formyl group into a hydroxymethyl group.

The aforesaid reactions are preferably carried out with the starting materials in solution or suspension in an inert organic solvent such as a substituted or unsubstituted aromatic hydrocarbon, for example, benzene, toluene, or dichlorobenzene. In the particular case of method (3), it is possible to replace, when Ar is phenyl, the metallic phenol derivative by a phenol and to effect the reaction in the presence of an acid-binding agent such as a carbonate, more especially potassium or sodium carbonate. In this case a ketone or an alcohol, more especially acetone, methylethyl ketone, or ethanol, may be employed as solvent.

For agricultural purposes, the new aryloxyalkoxyaliphatic acids and their derivatives of the present invention may be employed in any of the physical forms in which substances having a phytohormonal action are customarily used. They are usually employed in association with an inert diluent and in a concentration of at least 0.1 part per million parts of diluent. In the case of water-soluble compounds, e.g. the alkali metal salts, it is convenient to employ an aqueous solution where application in liquid form is desired. Alternatively, they may be used as solid compositions in conjunction, therefore, with solid diluents such as talc, clay or other such inert material. In the case of compounds insoluble or but sparingly soluble in water, it is convenient to employ them in the form of an aqueous emulsion incorporating a wetting, dispersing or emulsifying agent of the ionic or non-ionic type, the latter being preferred since they are not affected by electrolytes. The latter type of formulation is preferably made up as a self-emulsifying concentrate containing the active substance dissolved in the dispersing agent or in an organic solvent compatible with that dispersing agent, the composition being made ready for use by the simple addition of water. Specific compositions include aqueous solutions of water-soluble salts or amides which may contain a wetting agent, wettable powders containing either acid or amide in association with diluent powder and wetting agent, oil emulsions containing one or more of the esters and micronised oil suspensions of either acid or amide.

The following examples, in which the melting points given were determined on the Kofler bench, illustrate the invention.

*Example I*

To a solution of 153.5 g. of 4-chlorophenoxyethanol in 600 cc. of benzene are added 382 cc. of potassium ethoxide (19.5%). Alcohol is driven off by distillation of the alcohol-benzene azeotrope. When no more alcohol remains, 156.4 g. of ethyl bromacetate are added, and the mixture is heated under reflux for an hour and half. The reaction mixture is then taken up in 250 cc. of water; the benzene solution is separated, dried and then concentrated under reduced pressure. The residual oil is taken up in 1 litre of 2.1 N sodium hydroxide and agitated for 3 hours.

The aqueous solution is extracted with 2×250 cc. of ether to separate water-insoluble matter and the product is finally precipitated by the addition of 100 cc. of hydrochloric acid ($d=1.19$). The oil which precipitates is extracted with ether and, after drying in vacuo in the presence of sulphuric acid and concentration under reduced pressure, a solid residue is obtained which melts at 50–55° C. and weighs 50 g.

On recrystallisation from cyclohexane, 2-(4-chlorophenoxy)ethoxyacetic acid melting at 57–58° C. is obtained.

*Example II*

The procedure of Example I is followed but 2:4-dichlorophenoxyethanol is employed as starting material. The 2-(2:4-dichlorophenoxy)ethoxyacetic acid obtained melts at 82° C.

*Example III*

To a solution of 128.5 g. of p-chlorophenol in 1 litre of dimethylformamide are added 300 cc. of a 3.33 N sodium methoxide solution in methanol and the methanol is thereafter driven off by distillation; the temperature of the reaction mixture is then 157° C. The mixture is allowed to cool to about 135° C., at which temperature 119.5 g. of 2-chloroethoxyacetonitrile are added. The reaction is slightly exothermic and an abundant precipitate of sodium chloride is formed. When the addition of the 2-chloroethoxyacetonitrile is completed, the mixture is heated for a quarter of an hour under reflux and then allowed to return to the ambient temperature. After separation of the formed salt by filtration, the dimethylformamide is driven off under a pressure of 20–30 mm. Hg with heating at 70–80° C.

The residue is taken up in 500 cc. of chloroform and the solution obtained is washed with 2×500 cc. of distilled water and then with 2×500 cc. of an aqueous 10% sodium carbonate solution and finally with water. After drying over sodium sulphate and treatment with decolourising charcoal, the salt is separated by filtration and the solvent is driven off under a pressure of 20–30 mm. Hg with heating at 60–70° C.

The residue is rectified under reduced pressure and there are obtained 136 g. of 2-(4-chlorophenoxy)ethoxyacetonitrile boiling at 165–169° C. under 2 mm. Hg. On acid or alkaline hydrolysis of the 2-(4-chlorophenoxy)-ethoxyacetonitrile, there is obtained 2-(4-chlorophenoxy)-ethoxyacetic acid identical with the product of Example I.

The 2-chloroethoxyacetonitrile employed as starting material is prepared in accordance with Lingo and Henze [J. Amer. Chem. Soc. 61, 1574 (1939)].

*Example IV*

To a solution of 163 g. of 2:4-dichlorophenol in 1 litre of dimethylformamide are added 300 cc. of a 3.33 N sodium methoxide solution in methanol, whereafter the methanol is driven off by distillation. When no further methanol remains, the temperature of the reaction medium is 1560 C. The product is allowed to cool to 135° C. and 119.5 g. of 2-chloroethoxyacetonitrile are run in over a period of 35 minutes. When the addition is completed, the mixture is refluxed for 20 minutes.

The reaction mixture is thereafter treated as indicated in Example III, and on distillation there are finally obtained 91 g. of 2-(2:4-dichlorophenoxy)ethoxyacetonitrile boiling at 176–178° C. under 0.7 mm. Hg. The oil obtained crystallises eventually and, on recrystallisation from ethyl alcohol, the crystals obtained melt at 67–68° C.

On either acid or alkaline hydrolysis of the 2-(2:4-dichlorophenoxy)ethoxyacetonitrile, there is obtained 2-(2:4-dichlorophenoxy)ethoxyacetic acid identical with the product of Example II.

*Example V*

To a solution of 207 g. of 2:4-dichlorophenoxyethanol in 200 cc. of benzene are added 270 cc. of a 3.7 N sodium methoxide solution in methanol, the methanolbenzene azeotrope is distilled, benzene being periodically added until no more alcohol remains.

There are then added to the reaction mixture at room temperature 145.7 g. of potassium chloroacetate, and the mixture is rapidly stirred for 1 hour and then slowly heated to 60° C. at which temperature an exothermic reaction occurs which is moderated by external cooling with ice water to maintain a temperature of 60° C. for 1 hour.

After cooling of the reaction mixture, 400 cc. of water are added and the benzene is distilled off. When the benzene has been completely driven off, the product is treated with 5 g. of decolourising charcoal and filtered. The filtrate is acidified with 150 cc. of hydrochloric acid ($d=1.19$) and the oil which precipitates solidifies rapidly.

The solid is filtered off and brought into solution in 500 cc. of ether. The solution is decolourised with charcoal and is then extracted with 2×250 cc. of 2.5 N sodium hydroxide and with 125 cc. of the same sodium hydroxide solution. The combined aqueous solutions are heated on the water-bath to drive off the ether and then finally filtered.

After precipitation of the product by means of 150 cc. of hydrochloric acid ($d=1.19$), the oil formed rapidly crystallises. After filtering off the precipitate and drying it, there are obtained 185 g. of 2-(2:4-dichlorophenoxy)-ethoxyacetic acid identical with the product of Example II.

*Example VI*

To a solution of 103.5 g. of 2:4-dichlorophenoxyethanol in 800 cc. of benzene are added 209 cc. of 2.42 N sodium methoxide solution in methanol, whereafter the methanol is driven off by azeotropic distillation, benzene being periodically added. The temperature is then allowed to fall to about 70° C. and 51.5 g. of chloracetamide are gradually added and the mixture is heated at 70° C. for 1 hour.

To the reaction mixture 500 cc. of water are added and the benzene is driven off by distillation. To the mixture obtained 100 cc. of sodium hydroxide ($d=1.33$) are added and the mixture is refluxed for 2 hours. The reaction product is then diluted with 1 litre of water and acidified with 150 cc. of hydrochloric acid ($d=1.19$). The oil which precipitates is extracted with 3×400 cc. of ether. The ethereal solution is extracted with 2.5 litres of a 10% sodium bicarbonate solution. After treatment of the aqueous solution with decolourising charcoal, the solution is acidified with 175 cc. of hydrochloric acid ($d=1.19$).

The oil which precipitates crystallises rapidly. After separating and drying the precipitate, there are obtained 66 g. of 2-(2:4-dichlorophenoxy)ethoxyacetic acid identical with the product of Example II.

*Example VII*

To a solution of 100 g. of 2-methyl-4-chlorophenol in 700 cc. of dimethylformamide are added 200 cc. of a 3.5 N solution of sodium methoxide in methanol. When the alcohol has been driven off by distillation, 84 g. of 2-chloroethoxyacetonitrile are added at about 135° C., and treatment is continued as in Example IV.

After crystallisation from ethanol, there are obtained 71 g. of 2-(2-methyl-4-chlorophenoxy)ethoxyacetonitrile melting at 40° C.

On alkaline hydrolysis of 57 g. of the nitrile, there are obtained 57 g. of 2-(2-methyl-4-chlorophenoxy)ethoxyacetic acid melting at 74–75° C., which may be recrystallised from cyclohexane.

*Example VIII*

To a solution of 128.5 g. of 4-chlorophenol in 1 litre of dimethylformamide are added 300 cc. of a 3.3 N sodium methoxide solution and methanol is distilled off. 133.5 g. of 3-chloropropoxyacetonitrile are added to the boiling solution obtained and the procedure of Example IV is followed. After treatment, there are obtained 148 g. of 3-(4-chlorophenoxy)propoxyacetonitrile boiling at 166–168° C. under a pressure of 1 mm. Hg. On alkaline hydrolysis of 113 g. of this nitrile, followed by crystallisation from cyclohexane, there are obtained 75 g. of 3-(4-chlorophenoxy)propoxyacetic acid melting at 66–68° C.

*Example IX*

By proceeding as in Example IV, but starting with 128.5 g. of 2-chlorophenol, 300 cc. of 3.33 N sodium methoxide, 1 litre of dimethylformamide and 119.5 g. of 2-chloroethoxyacetonitrile, there are obtained 130 g. of 2-(2-chlorophenoxy)ethoxyacetonitrile boiling at 154–160° C. under a pressure of 1 mm. Hg.

On alkaline hydrolysis of 106 g. of this nitrile, there are obtained 87 g. of 2-(2-chlorophenoxy)ethoxyacetic acid in the form of its sodium salt, which is recrystallised from 70% alcohol and which melts at 170° C.

*Example X*

By proceeding as in Example IV but starting with 82 g. of 2:4-dimethylphenol, 185 cc. of a 3.63 N sodium methoxide solution in methanol, 670 cc. of dimethylformamide and 80.1 g. of 2-chloroethoxyacetonitrile, there are obtained 71 g. of 2-(2:4-dimethylphenoxy)ethoxyacetonitrile boiling at 151–157° C. under a pressure of 2.5 mm. Hg.

On alkaline hydrolysis of 71 g. of this nitrile, there are obtained after recrystallisation from cyclohexane 65 g. of 2-(2:4-dimethylphenoxy)ethoxyacetic acid melting at 62–63° C.

*Example XI*

By proceeding as in Example IV but starting with 44.5 g. of 4-chlorophenol, 75 cc. of a 4.5 N sodium methoxide solution in methanol, 330 cc. of dimethylformamide and 44.5 g. of 2-chloropropoxyacetonitrile, there are obtained 31 g. of 2-(4-chlorophenoxy)propoxyacetonitrile boiling at 151° C. under a pressure of 1 mm. Hg.

On alkaline hydrolysis of 31 g. of the nitrile, followed by crystallisation of the product from cyclohexane, there are obtained 27 g. of 2-(4-chlorophenoxy)propoxyacetic acid melting at 71° C.

The 2-chloropropoxyacetonitrile employed as starting material is prepared in accordance with Spurlock and Henze [J. Org. Chem. 4, 234 (1939)].

*Example XII*

By proceeding as in Example IV but starting with 144 g. of β-naphthol, 234 cc. of 4.27 N sodium methoxide, 1 litre of dimethylformamide and 119.6 g. of 2-chloroethoxyacetonitrile, there are obtained 158 g. of 2-(β-naphthoxy) ethoxyacetonitrile melting at 45° C. after crystallisation from ethanol.

After alkaline hydrolysis of 158 g. of this nitrile, followed by crystallisation of the product from cyclohexane, there are obtained 46 g. of 2-(β-naphthoxy)ethoxyacetic acid melting at 88–90° C.

*Example XIII*

By proceeding as in Example IV but starting with 78.3 g. of 2-formyl-4-chlorophenol, 166 cc. of a 3 N sodium methoxide solution in methanol, 500 cc. of dimethylformamide and 59.8 g. of 2-chloroethoxyacetonitrile, there are obtained 58 g. of 2-(2-formyl-4-chlorophenoxy)ethoxyacetonitrile melting at 76–78° C. after recrystallisation from ethanol.

On hydrolysis of 12 g. of this nitrile in hydrochloric acid medium, followed by crystallisation of the product from benzene, there are obtained 8 g. of 2-(2-formyl-4-chlorophenoxy)ethoxyacetic acid melting at 94–96° C.

*Example XIV*

To a solution of 25.8 g. of 2-(2-formyl-4-chlorophenoxy)ethoxyacetic acid in 101 cc. of N sodium hydroxide solution are added 10 g. of Raney nickel. The mixture is hydrogenated at atmospheric pressure and at room temperature. When the hydrogenation is completed, the Raney nickel is separated off, and 2-(2-hydroxymethyl-4-chlorophenoxy)ethoxyacetic acid is precipitated. After recrystallisation from benzene, there are obtained 17 g. of product melting at 84° C.

*Example XV*

By proceeding as in Example III but starting with 32.3 g. of 3:4-dichlorophenol, 10.8 g. of sodium methoxide in 60 cc. of methanol, 200 cc. of dimethylformamide and 23.9 g. of 2-chloroethoxyacetonitrile, there are obtained 32.5 g. of 2-(3:4-dichlorophenoxy)ethoxyacetonitrile boiling at 170–171° C. under a pressure of 1 mm. of mercury.

On hydrolysis of 32 g. of this nitrile in hydrochloric acid medium, there are obtained 33.5 g. of 2-(3:4-dichlorophenoxy)ethoxyacetic acid, which melts at 79° C. after recrystallisation from benzene.

*Example XVI*

132.5 g. of 2-(2:4-dichlorophenoxy)ethoxyacetic acid (prepared as in Example II) are introduced into 114 g. of isopropanol and 250 cc. of benzene. Sulphuric acid (2 cc.; d=1.83) is added and the water-isopropanol azeotrope is distilled, whereafter the benzene-isopropanol mixture is distilled without the temperature of the medium exceeding 80° C. At this temperature, 10 g. of calcium carbonate are added and the mixture is agitated for a further 10 minutes while being allowed to cool. The reaction mixture is taken up in 200 cc. of benzene and is washed with water and then with sodium bicarbonate. After drying and distillation of the benzene, there remains a residue weighing 141 g. which is isopropyl 2-(2:4-dichlorophenoxy)ethoxyacetate boiling at 173–176° C. under a pressure of 0.7 mm. Hg.

*Example XVII*

To 119 g. of thionyl chloride there are gradually added 98.5 g. of 2-(4-chlorophenoxy)ethoxyacetic acid. When all the acid has passed into solution, the mixture is heated until the evolution of gas ceases; the excess of thionyl chloride is then driven off under a pressure of 30 to 40 mm. Hg with heating at 70–80° C. The residue obtained is poured drop by drop into 204 g. of methanol without the temperature exceeding 30° C. The mixture obtained is treated with decolourising charcoal and then filtered. After concentration under reduced pressure, there remains an oil weighing 102.5 g., which is methyl 2-(4-chlorophenoxy)ethoxyacetate boiling at 169–170° C. under a pressure of 2 mm. Hg.

Example XVIII

To 40 g. of isopropyl 2-(2:4-dichlorophenoxy)ethoxyacetate (prepared as in Example XVI) there are added 25 cc. of ammonia (d=0.92) and the mixture is heated in an autoclave at 100° C. for 2 hours. The solution obtained is evaporated under reduced pressure. The solid residue is crystallised from a mixture of ethanol and cyclohexane. There are thus obtained 16 g. of 2-(2:4-dichlorophenoxy)ethoxyacetamide, M.P. 100° C.

The following examples illustrate selective herbicidal compositions according to the invention. Practical tests have shown that these compositions exhibit decided advantage in the selective control of weeds in areas of growing crops that are susceptible to known selective herbicides of the 2:4-dichlorophenoxyacetic acid type. More particularly, these compositions have been demonstrated to exhibit effective control in pea, bean and clover crops of such common weeds as *Cirsium arvense, Chenopodium album, Raphanus raphanistrum, Lychnis githago, Sinapis arvensis* and *Solanum nigrum*. The compositions of the invention have also shown advantage in the selective control of common weeds in maize crops.

Example XIX

To 52 g. of 2-(2:4-dichlorophenoxy)ethoxyacetic acid are added 28 g. of triethanolamine, 5 g. of a wetting agent obtained by condensation of ethylene oxide with colophony, and the mixture is made up to 100 cc. with water. The solution obtained is diluted according to requirements.

Example XX

There are added to 250 g. of 2-(2:4-dichlorophenoxy)-ethoxyacetic acid 70 g. of diethylamine and 25 g. of the wetting agent mentioned in the preceding example. After dilution to 1 litre with water, a solution is obtained which is further diluted at the site of use according to requirements.

Example XXI

A solution of 25 g. of 2-(4-chlorophenoxy)ethoxyacetic acid in 10.9 cc. of sodium hydroxide solution (d=1.33) is prepared and 2.5 g. of the wetting agent indicated in Example XIX are added. The solution is made up to 100 cc. with water. This solution is diluted according to requirements.

Example XXII

A solution of 250 g. of isopropyl 2-(2:4-dichlorophenoxy)ethoxyacetate (prepared as described in Example XVI) in 250 cc. of xylene is prepared and 20 g. of a condensation product of octylphenol and ethylene oxide are added. After dilution to 1 litre by the addition of xylene, a solution is obtained which disperses readily in water and which is further diluted at the site of use according to requirements.

I claim:

1. A member of the class consisting of aryloxyethoxyacetic acids of the formula:

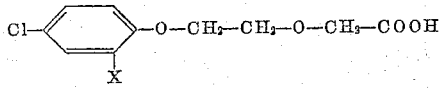

wherein X is selected from the class consisting of hydrogen, chlorine, methyl, formyl and hydroxymethyl, the alkali metal, diethylamine and triethanol amine salts of such acids, and the unsubstituted amides of such acids.
2. 2-(4-Chlorophenoxy)ethoxyacetic acid.
3. 2-(2:4-Dichlorophenoxy)ethoxyacetic acid.
4. 2-(2-Methyl-4-chlorophenoxy)ethoxyacetic acid.
5. 2-(2-Formyl-4-chlorophenoxy)ethoxyacetic acid.
6. 2-(2-Hydroxymethyl-4-chlorophenoxy)ethoxyacetic acid.

References Cited in the file of this patent
UNITED STATES PATENTS

| | | |
|---|---|---|
| 2,083,482 | Steindorff et al. | June 8, 1937 |
| 2,280,792 | Bruson | Apr. 28, 1942 |
| 2,766,279 | Jenney | Oct. 9, 1956 |
| 2,818,425 | Heywood | Dec. 31, 1957 |

FOREIGN PATENTS

| | | |
|---|---|---|
| 813,367 | Great Britain | May 13, 1959 |